(12) United States Patent  
Komarnisky

(10) Patent No.: US 8,376,673 B2  
(45) Date of Patent: Feb. 19, 2013

(54) LOAD RESTRAINT INSTALLATION APPARATUS

(76) Inventor: Gordon Komarnisky, Grande Prairie (CA)

(*) Notice: Subject to any disclaimer, the term of this patent is extended or adjusted under 35 U.S.C. 154(b) by 278 days.

(21) Appl. No.: 12/619,217

(22) Filed: Nov. 16, 2009

(65) Prior Publication Data

US 2010/0074709 A1 Mar. 25, 2010

(30) Foreign Application Priority Data

Sep. 19, 2008 (CA) .................................... 2639625

(51) Int. Cl.
*B61D 45/00* (2006.01)
*B65D 63/00* (2006.01)

(52) U.S. Cl. ............... 410/96; 410/35; 410/97; 414/607

(58) Field of Classification Search .................. 410/31, 410/32, 34, 41, 155, 97, 91, 96, 98, 100, 410/46, 77, 94, 120, 121; 414/607; 297/81.56; B61D 45/00; B65D 63/00

See application file for complete search history.

(56) References Cited

U.S. PATENT DOCUMENTS

| | | | | |
|---|---|---|---|---|
| 1,638,612 A * | 8/1927 | Baus | .............................. | 410/120 |
| 2,793,904 A * | 5/1957 | Gale | .............................. | 294/74 |
| 2,820,561 A * | 1/1958 | Meagher | .............................. | 414/607 |
| 3,016,973 A * | 1/1962 | Williamson | .............................. | 182/14 |
| 3,101,128 A | 8/1963 | Dane | | |
| 3,889,833 A | 6/1975 | Thomas | | |
| 5,096,018 A | 3/1992 | Dickinson, Jr. | | |
| 5,344,277 A * | 9/1994 | Sandland | .............................. | 414/607 |
| 5,445,032 A * | 8/1995 | Dixon | .............................. | 73/788 |
| 5,499,694 A * | 3/1996 | Dorn | .............................. | 187/200 |
| 5,555,953 A | 9/1996 | Henderson | | |
| 5,657,887 A | 8/1997 | Smith | | |
| 5,876,164 A * | 3/1999 | Hamelin et al. | .............................. | 410/35 |
| 6,283,700 B1 | 9/2001 | Oltrogge | | |
| 6,634,850 B2 | 10/2003 | Christensen | | |
| 6,811,202 B2 * | 11/2004 | Hornady | .............................. | 296/100.01 |
| 7,182,387 B2 | 2/2007 | Hartman et al. | | |
| 7,192,230 B2 | 3/2007 | Hartman | | |

* cited by examiner

*Primary Examiner* — Glenn Dayoan  
*Assistant Examiner* — Sunsurraye Westbrook  
(74) *Attorney, Agent, or Firm* — Davis & Bujold, PLLC

(57) ABSTRACT

There is provided a load restraint installation apparatus comprising of an elongated body, tie receivers positioned at spaced intervals along the body, and a mounting assembly for mounting the body to a lifting apparatus, such that straps or cables are received in the tie receivers and then the body is lifted by the lifting apparatus to position the straps or cables at a top of a load on a transport vehicle.

14 Claims, 2 Drawing Sheets

LOAD RESTRAINT INSTALLATION APPARATUS

FIELD

The present invention relates to making the installation of straps or cables restraining a load on a transport vehicle a safer procedure.

BACKGROUND

Transport vehicles, such as transport trucks or rail cars are used to transport freight. Depending upon the nature of the freight, it can be imperative that straps or cables be used as load restraints. At the present time, the installation process is a two man job. A first man is generally positioned on top of a load. A second man is positioned on the ground adjacent to the load. The second man tosses a free end of a cable or strap to the first man. The free end of he cable or strap generally carries a buckle or other form of fastening device. This is not safe for the first man, as there is a danger of the first man falling as he attempts to catch the free end of the cable. The is not safe for the second man for, should the first man miss the free end of the cable, the free end of the cable will plummet back down to the ground. There is a need for a load restraint installation apparatus that will make the installation of straps or cables restraining a load on a transport vehicle a safer procedure.

SUMMARY

There is provided a load restraint installation apparatus comprising of an elongated body, tie receivers positioned at spaced intervals along the body, and a mounting assembly for mounting the body to a lifting apparatus, such that straps or cables are received in the tie receivers and then the body is lifted by the lifting apparatus to position the straps or cables at a top of a load on a transport vehicle.

In one embodiment, the body may be in the form of a fall protection fence which enhances safety by limiting the movement of a worker atop a load.

In another embodiment, there may also be a suspension arm positioned at one end of the body and a retractable safety line suspended from the arm which enhances the safety of a worker wearing a harness attached to the retractable safety line in the event of a fall.

In a further embodiment, the mounting assembly may include fork lift tine receivers, such that the body can be mounted onto and supported by tines of a fork lift.

In yet another embodiment, corner guards may be slidably engaged with the straps or cables so as to protect loads vulnerable to damage caused by the straps or cables.

In yet a further embodiment, each tie receiver may be formed so as to be capable of receiving both one of the straps or cables and one of the corner guards. This enhances efficiency of the installation process by allowing ready access to both the strap or cable and its associated corner guard since the corner guard may otherwise slide to a less accessible position.

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION

Figure 1:
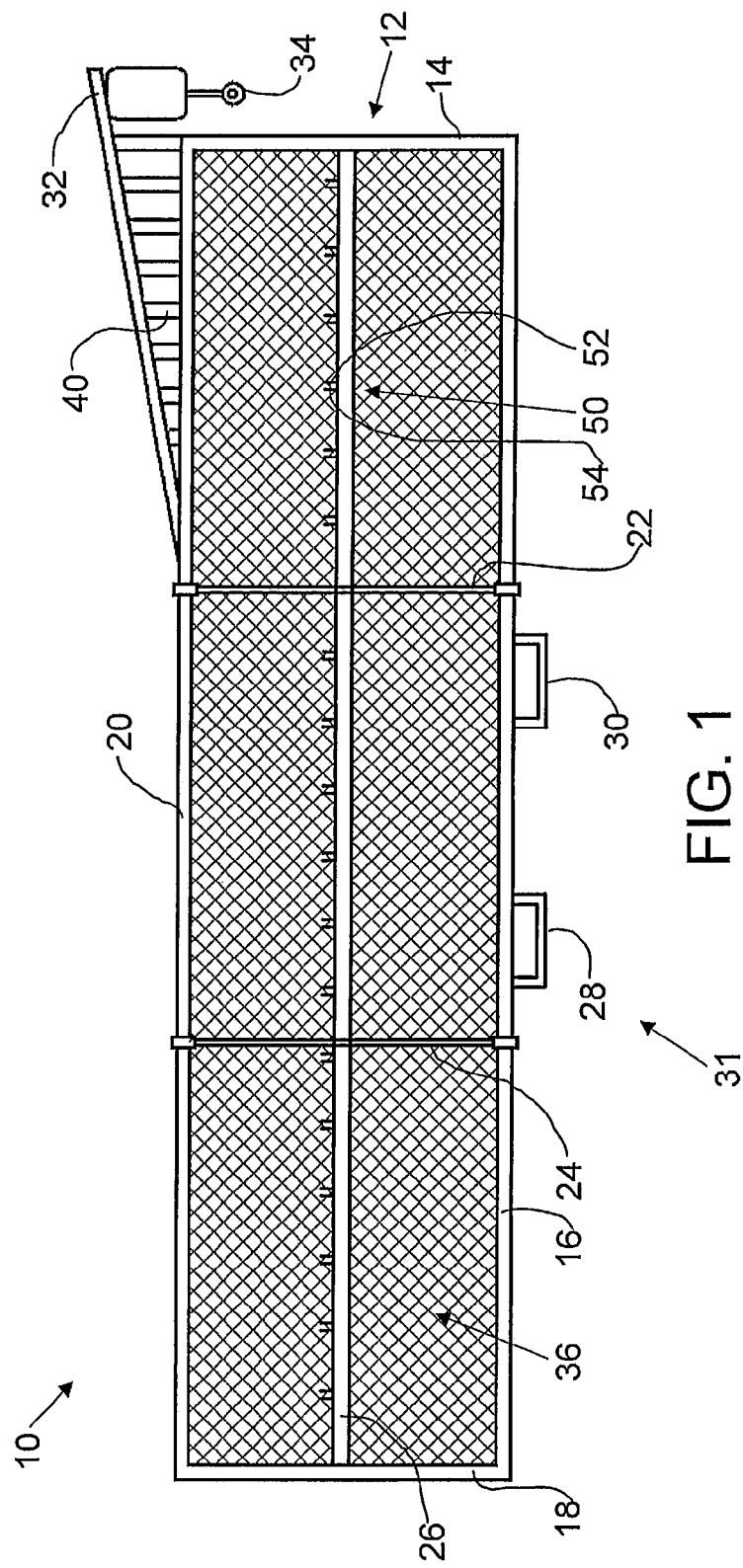
FIG. 1 is a front elevation view of one embodiment of the load restraint installation apparatus.

One embodiment of a load restraint installation apparatus generally identified by reference numeral 10, will now be described with reference to FIG. 1, FIG. 2 and FIG. 3.

Structure and Relationship of Parts:

Referring to FIG. 1, load restraint installation apparatus 10 comprises fall protection fence 12. Whereas FIG. 1 depicts a frontal view of fall protection fence 12, FIG. 2 best shows fall protection fence having a back-side 70 (shown only in FIG. 2) and a front-side 72 (shown only in FIG. 2). Referring again to FIG. 1, fall protection fence 12 is generally of a length substantially equal to that of transport vehicle decks with which it is to be used, for example, a rail car deck having a length of 73 feet necessitates that the length of fall protection fence 12 also be approximately 73 feet. The height of fall protection fence 12 may vary slightly while still providing fall protection to a worker of average stature. In most cases, a height of 4 to 6 feet is generally preferable.

Continuing to refer to FIG. 1, fall protection fence 12 comprises a right frame member 14, a left frame member 18, a bottom frame member 16, a top frame member 20, a centre-right frame member 22, a centre-left frame member 24, and a middle frame member 26 interposed with wire netting 36. Middle frame member 26 extends lengthwise from the midpoint of left frame member 18 to the midpoint of right frame member 14. Identical tie receivers each of which is denoted 50 are positioned at spaced intervals along back-side 70 (shown only in FIG. 2) of middle frame member 26. It will be appreciated that the number of tie receivers 50 and their relative spacing will be dependent on the length of fall protection fence 12. In the present embodiment, 18 evenly spaced tie receivers 50 are preferable.

Figure 2:
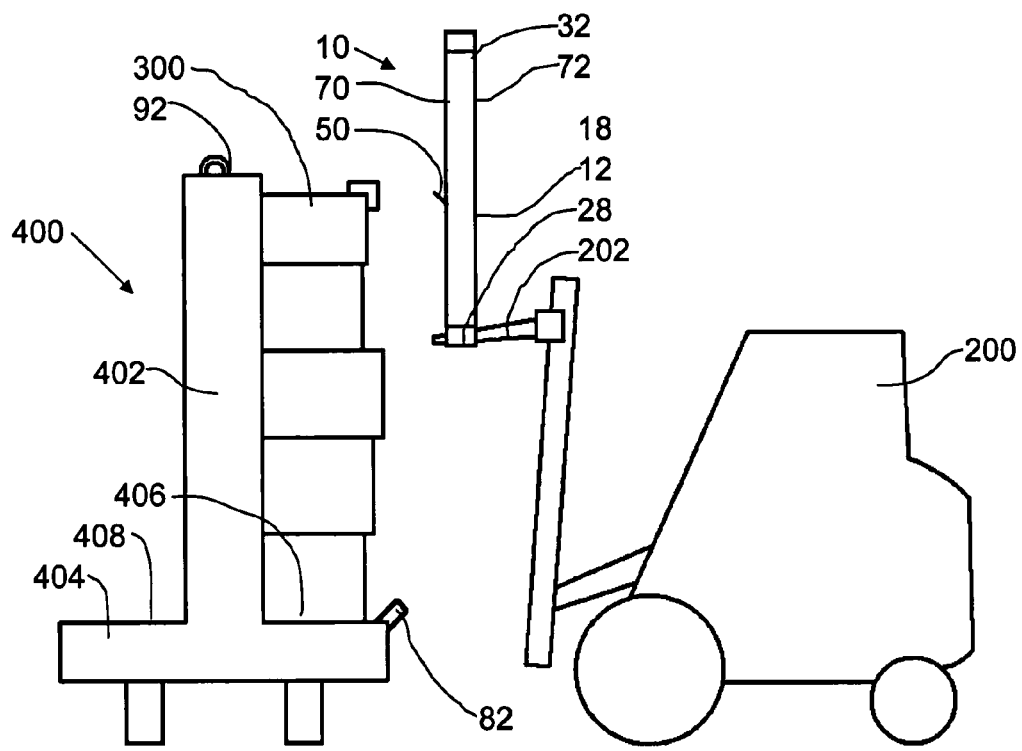
FIG. 2 is a left side view of the load restraint installation apparatus of FIG. 1 in typical operation restraining a load on a rail car deck while being lifted by a fork lift.
Figure 3:
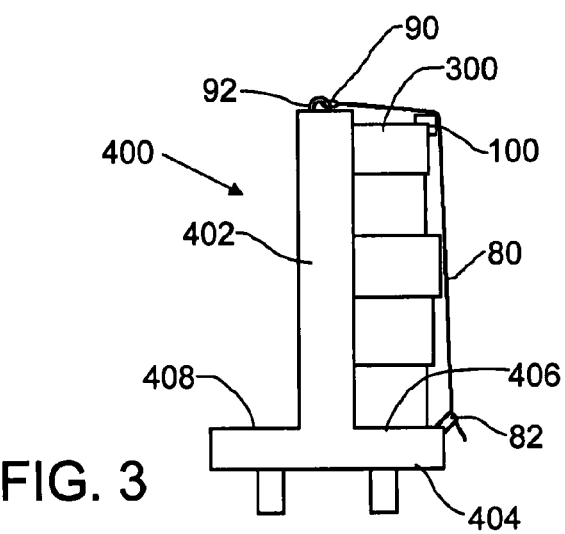
FIG. 3 is a left side view of the rail car of FIG. 2 after completion of the restraining installation.

Now referring to FIG. 3, straps or cables each of which is denoted 80 may be removably secured (although not shown secured in FIG. 3) to any number of tie receivers 50 (shown only in FIG. 1 and FIG. 2). A corner guard 100 is be slidably engaged with each strap or cable 80 so as to protect loads vulnerable to damage caused by straps or cables 80. Rail car 400 comprises a rail car divider 402 and a divided rail car deck 404 having a first side 406 and a second side 408. One end of each cable 80 is attached to chain link headers each of which is denoted 90 that are removably securable to a series of identical apertures each of which is denoted 92 positioned at spaced intervals located atop rail car divider 402, preferably having an identical number and spacing scheme as tie receivers 50. There are also provided a series of ratchets, each of which is denoted 82, positioned at spaced intervals located on the first side 406 of divided rail car deck 404, preferably having an identical number and spacing scheme as tie receivers 50. It should be appreciated that the description herein can be mirrored to readily include the second side 408 of divided rail car deck 404.

Referring again to FIG. 1, each tie receiver 50 contains a right upwards pointing protrusion 52 and a left upwards pointing protrusion 54 allowing the receipt of both one of the straps or cables 80 (shown only in FIG. 3) and one of the corner guards 100 (shown only in FIG. 3). This enhances efficiency of the installation process by allowing ready access to both strap or cable 80 (shown only in FIG. 3) and its associated corner guard 100 (shown only in FIG. 3) since corner guard 100 may otherwise slide to a less accessible position.

Continuing to refer to FIG. 1, fork lift tine receivers 28 and 30 are secured to bottom frame member 16 as part of a mounting assembly 31. A suspension arm 32 is positioned at one end of top frame member 20 and is supported by substantially parallel struts each of which is denoted as 40. A retractable safety line 34 is suspended from suspension arm 32. It will be appreciated that retractable safety line 34 can be removably attached to a harness (not shown) worn by a worker so as to enhance safety as the worker climbs to the top of the load and climbs down from the top of the load.

Operation:

Referring to FIG. 2, a worker engages the end of any number of straps or cables 80 (shown only in FIG. 3) having chain link header 90 (shown only in FIG. 3) on to any corresponding number of tie receivers 50. The worker then secures the other end of each strap or cable 80 (shown only in FIG. 3) loosely to one of ratchets 82. Next, the worker operates a fork lift 200 by inserting its tines each of which is denoted 202 into fork lift tine receivers 28 and 30. The worker then aligns fall protection fence 12 against or close to a load 300 being retrained with front-side 72 facing fork lift 200 and back-side 70 facing load 300. The worker then operates forklift 200 to lift fall protection fence 12 such that top frame member 20 (shown only in FIG. 1) is 3 to 5 feet above the top of load 300. Next, the worker dismounts fork lift 200, puts on the harness and attaches the harness to retractable safety line 34 (shown only in FIG. 1). Now, the worker proceeds to climb to the top of load 300 placed atop rail car 400. Once at the top of the load, the worker must become detached from retractable safety line 34 during movement on top of the car. However, the worker is protected against falling by the positioning of fall protection fence 12.

Referring now to FIG. 3, once atop load 300, the worker disengages each strap or cable 80 from its corresponding tie receiver 50 (shown only in FIG. 1 and FIG. 2). Now, the worker proceeds to secure each chain link header 90 with each aperture 92. The worker then dismounts load 300 and tightens each strap or cable 80 at each ratchet 82.

It will be appreciated that only one worker is required to complete the restraint installation described herein using the present invention. It will also be appreciated that when aligned and lifted, fall protection fence 12 limits the movement of workers working at substantial heights, thereby enhancing safety.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiments without departing from scope of the Claims.

What is claimed is:

1. A load restraint installation apparatus, comprising:
   a fall protection fence having a top and a bottom;
   tie receivers positioned at spaced intervals along the fall protection fence midway between the top and bottom of the fall protection fence; and
   a mounting assembly for mounting the fall protection fence to a lifting apparatus, such that straps or cables are received in the tie receivers and then the fall protection fence is lifted by the lifting apparatus to position the straps or cables at a top of a load on a transport vehicle.

2. The load restraint installation apparatus of claim 1, wherein a suspension arm is positioned at one end of the fall protection fence and a retractable safety line is suspended from the arm.

3. The load restraint installation apparatus of claim 1, wherein the mounting assembly includes fork lift tine receivers, such that the fall protection fence can be mounted onto and supported by tines of a fork lift.

4. The load restraint installation apparatus of claim 1, wherein corner guards are slidably engaged with the straps or cables.

5. The load restraint installation apparatus of claim 4, wherein each tie receiver is capable of receiving both a strap or cable and a corner guard.

6. The load restraint installation apparatus of claim 1, wherein the fall protection fence comprises a right frame member, a left frame member, a bottom frame member, a top frame member and a middle frame member spaced between the bottom frame member and the top frame member, and the tie receivers are positioned on the middle frame member.

7. A load restraint installation apparatus, comprising:
   a fall protection fence having a top and a bottom;
   tie receivers positioned at spaced intervals along the fall protection fence at a point midway between the top and bottom of the fall protection fence;
   a mounting assembly for mounting the fall protection fence to a lifting apparatus, such that straps or cables are received in the tie receivers and then the fall protection fence is lifted by the lifting apparatus to position the straps or cables at a top of a load on a transport vehicle.

8. The load restraint installation apparatus of claim 7, wherein a suspension arm is positioned at one end of the fall protection fence and a retractable safety line is suspended from the arm.

9. The load restraint installation apparatus of claim 7, wherein the mounting assembly includes fork lift tine receivers, such that the fall protection fence can be mounted onto and supported by tines of a fork lift.

10. The load restraint installation apparatus of claim 7, wherein corner guards are slidably engaged with the straps or cables.

11. The load restraint installation apparatus of claim 10, wherein each tie receiver is capable of receiving both a strap or cable and a corner guard.

12. The load restraint installation apparatus of claim 7, wherein the fall protection fence comprises a right frame member, a left frame member, a bottom frame member, a top frame member and a middle frame member spaced between the bottom frame member and the top frame member, and the tie receivers are positioned on the middle frame member.

13. A load restraint installation apparatus, comprising:
   a fall protection fence having a top and a bottom;
   tie receivers positioned at spaced intervals along the fall protection fence at a point midway between the top and bottom of the fall protection fence;
   fork lift tine receivers for mounting the fall protection fence to a fork lift, such that straps or cables are received in the tie receivers and then the fall protection fence is lifted by the fork lift to position the straps or cables at a top of a load on a transport vehicle;

a suspension arm is positioned at one end of the fall protection fence and a retractable safety line is suspended from the arm; and corner guards slidably engaged with the straps or cables, wherein each tie receiver is capable of receiving both a strap or cable and a corner guard.

14. The load restraint installation apparatus of claim 13, wherein the fall protection fence comprises a right frame member, a left frame member, a bottom frame member, a top frame member and a middle frame member spaced between the bottom frame member and the top frame member, and the tie receivers are positioned on the middle frame member.

* * * * *